United States Patent
Kirikawa

(10) Patent No.: US 11,606,430 B2
(45) Date of Patent: Mar. 14, 2023

(54) INFORMATION PROCESSING APPARATUS

(71) Applicant: FUJIFILM Business Innovation Corp., Tokyo (JP)

(72) Inventor: Shota Kirikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/110,300

(22) Filed: Dec. 3, 2020

(65) Prior Publication Data

US 2021/0320976 A1 Oct. 14, 2021

(30) Foreign Application Priority Data

Apr. 9, 2020 (JP) .............................. JP2020-070158

(51) Int. Cl.
*G06F 15/173* (2006.01)
*H04L 67/1097* (2022.01)
*H04L 9/40* (2022.01)

(52) U.S. Cl.
CPC .......... *H04L 67/1097* (2013.01); *H04L 63/08* (2013.01); *H04L 63/105* (2013.01); *H04L 63/0815* (2013.01)

(58) Field of Classification Search
CPC ... H04L 57/1097; H04L 63/08; H04L 62/105; H04L 67/1097; H04L 63/105; H04L 67/303; H05L 63/0815
USPC ................................ 709/220, 224, 225, 227
See application file for complete search history.

(56) References Cited

U.S. PATENT DOCUMENTS

| | | | |
|---|---|---|---|
| 9,251,150 B2 | 2/2016 | Hirakata et al. | |
| 9,332,040 B2* | 5/2016 | Logue | G08B 7/066 |
| 9,912,652 B2 | 3/2018 | Hirakata et al. | |
| 9,971,884 B1* | 5/2018 | Simca | G06F 21/305 |
| 10,110,600 B1* | 10/2018 | Simca | G06N 20/00 |
| 10,193,975 B2* | 1/2019 | Beerana | G06F 9/5072 |
| 10,270,751 B2 | 4/2019 | Hirakata et al. | |
| 10,313,404 B2* | 6/2019 | Ein-Gil | H04L 67/16 |
| 10,394,765 B2* | 8/2019 | Schoeffler | H04L 67/1095 |
| 10,554,647 B2 | 2/2020 | Hirakata et al. | |
| 10,762,230 B2* | 9/2020 | Ancin | G06F 16/1844 |
| 10,812,521 B1* | 10/2020 | Sharifi Mehr | H04L 63/1433 |
| 2013/0347070 A1* | 12/2013 | Cairns | H04L 63/08 726/3 |
| 2014/0101434 A1* | 4/2014 | Senthurpandi | G06F 12/1408 713/150 |
| 2014/0289833 A1* | 9/2014 | Briceno | H04L 63/08 726/7 |
| 2015/0089612 A1* | 3/2015 | Kuo | H04L 67/1001 726/6 |

(Continued)

FOREIGN PATENT DOCUMENTS

| | | |
|---|---|---|
| JP | H0944393 | 2/1997 |
| JP | 2018097861 | 6/2018 |
| JP | 2019040637 | 3/2019 |

*Primary Examiner* — Khanh Q Dinh
(74) *Attorney, Agent, or Firm* — JCIPRNET

(57) ABSTRACT

An information processing apparatus includes a processor configured to receive, from a first user, data and data identification information for identifying the data, generate association information that associates the data identification information with cloud-storage identification information for identifying a cloud storage for storing the data from among multiple cloud storages, and store the data in the cloud storage.

10 Claims, 10 Drawing Sheets

(56) References Cited

U.S. PATENT DOCUMENTS

| | | | |
|---|---|---|---|
| 2015/0134861 A1* | 5/2015 | Park | G06F 3/0655 |
| | | | 710/74 |
| 2015/0302338 A1* | 10/2015 | Zaveri | H04L 67/1001 |
| | | | 705/7.39 |
| 2016/0292193 A1* | 10/2016 | Madanapalli | G06F 21/6218 |
| 2017/0264687 A1* | 9/2017 | Beerana | G06F 3/0664 |
| 2017/0331801 A1* | 11/2017 | Mezei | H04L 63/068 |
| 2018/0007099 A1* | 1/2018 | Ein-Gil | H04L 67/51 |
| 2018/0082076 A1* | 3/2018 | Murray | H04L 9/0643 |
| 2018/0109532 A1* | 4/2018 | Cairns | H04L 63/126 |
| 2019/0087432 A1* | 3/2019 | Sion | G06F 16/21 |
| 2019/0265868 A1* | 8/2019 | Penilla | B60W 40/08 |
| 2020/0127990 A1 | 4/2020 | Hirakata et al. | |
| 2020/0225655 A1* | 7/2020 | Cella | G05B 23/024 |

\* cited by examiner

FIG. 4

| DOCUMENT FILE NAME | STORAGE NAME | STORAGE USER ID | STORAGE PASSWORD | FILE PATH | SHARING PERMISSION INFORMATION |
|---|---|---|---|---|---|
| DOCUMENT FILE Fa | STORAGE Sa | AA | 12341234 | http://www.sa.com/···/fa.pdf | SHARE |
| DOCUMENT FILE Fb | STORAGE Sb | AB | 34563456 | http://www.sb.com/···/fb.pdf | SHARE |
| DOCUMENT FILE Fc | STORAGE Sc | AC | 56785678 | http://www.sc.com/···/fc.pdf | NOT SHARE |

INFORMATION PROCESSING APPARATUS

CROSS-REFERENCE TO RELATED APPLICATIONS

This application is based on and claims priority under 35 USC 119 from Japanese Patent Application No. 2020-070158 filed Apr. 9, 2020.

BACKGROUND

(i) Technical Field

The present disclosure relates to an information processing apparatus.

(ii) Related Art

A known information processing apparatus (for example, see Japanese Unexamined Patent Application Publication No. 2019-40637), which manages information stored in storage locations, includes an authentication management unit, a storage-location monitoring unit, and an information management unit. The authentication management unit manages first authentication information and second authentication information which are associated with each other. The first authentication information is necessary to authenticate a client apparatus requesting an operation performed on information. The second authentication information is necessary to authenticate storage locations in which information is stored. The storage-location monitoring unit monitors the information stored in the storage locations by using the second authentication information, and updates index information of the information stored in the storage locations. The information management unit generates a list of the pieces of information stored in the storage locations by using the index information of the information stored in the storage location, and provides the list to the client apparatus.

Data received from a user may be stored in any one of multiple cloud storages. At that time, if association information for specifying data is generated by using cloud-storage identification information such as cloud names and file paths, a user specifies data, for example, for download, by using the cloud-storage identification information. This causes the user to be aware of the cloud storage in which the data is stored.

SUMMARY

Aspects of non-limiting embodiments of the present disclosure relate to a technique in which, after data received from a user is stored in any one of multiple cloud storages, the user is not necessarily aware of the cloud storage in which the data is stored.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to receive, from a first user, data and data identification information for identifying the data. The processor is configured to generate association information that associates the data identification information with cloud-storage identification information for identifying a cloud storage for storing the data from among multiple cloud storages, and store the data in the cloud storage.

BRIEF DESCRIPTION OF THE DRAWINGS

Exemplary embodiment of the present disclosure will be described in detail based on the following figures, wherein:

FIG. 4 is a diagram illustrating exemplary storage mapping information stored in a storage-mapping storing unit;

DETAILED DESCRIPTION

An exemplary embodiment of the present disclosure will be described in detail below by referring to the attached drawings.

The Overall Configuration of a Storage System

Figure 1:
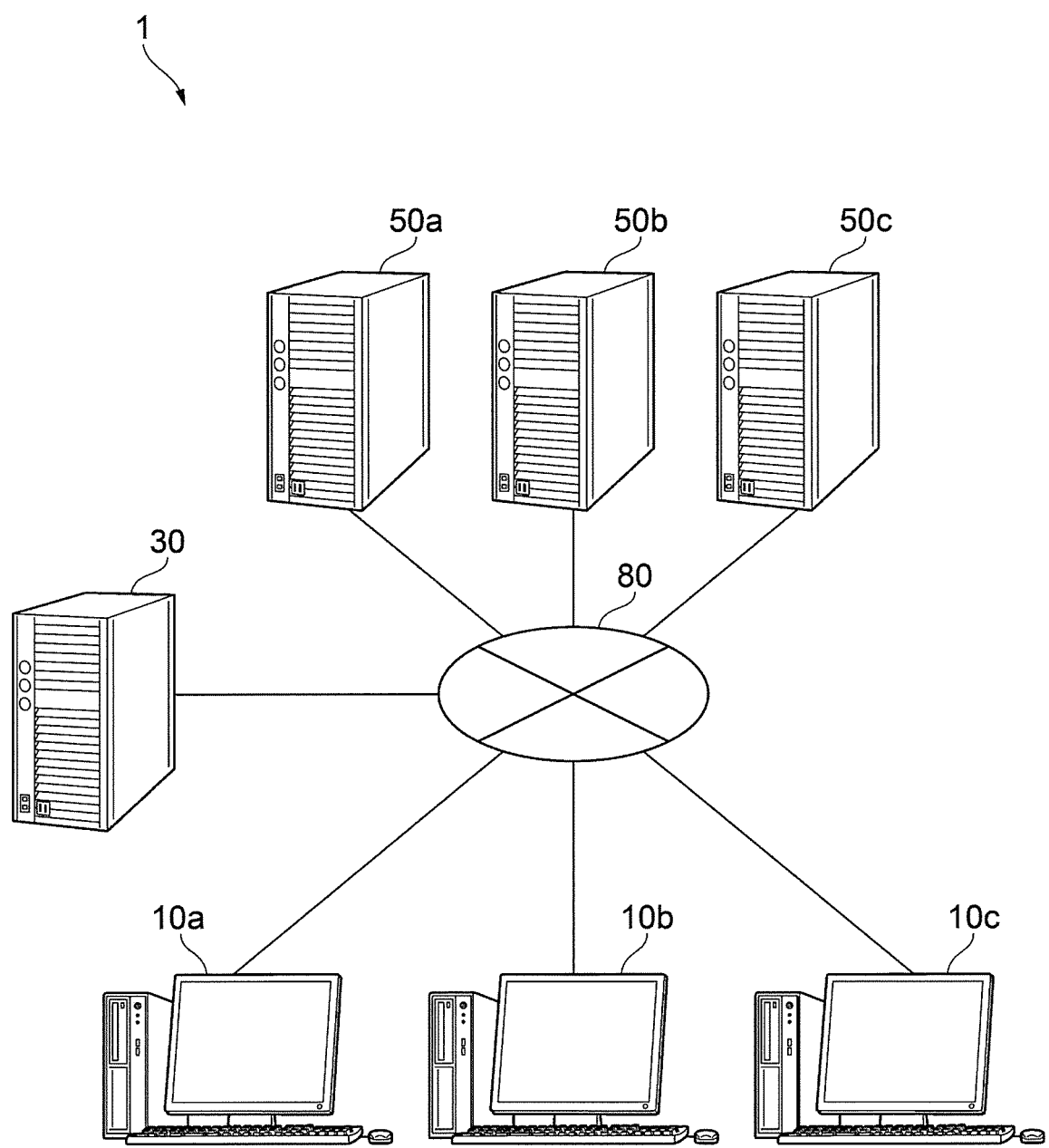
FIG. 1 is a diagram illustrating an exemplary overall configuration of a storage system to which an exemplary embodiment of the present disclosure is applied.

FIG. 1 is a diagram illustrating an exemplary overall configuration of a storage system 1 to which the present exemplary embodiment is applied. The storage system 1, for example, provides a cloud storage service of storing data on the Internet. As illustrated in FIG. 1, the storage system 1 includes terminal apparatuses 10a to 10c, an information processing apparatus 30, and cloud storages 50a to 50c which are connected to a communication line 80. FIG. 1 illustrates the terminal apparatuses 10a to 10c. When the terminal apparatuses 10a to 10c are not necessarily differentiated from each other, they may be referred to as terminal apparatuses 10. FIG. 1 illustrates the three terminal apparatuses 10. Alternatively, two terminal apparatuses 10 or four terminal apparatuses 10 or more may be provided. FIG. 1 illustrates the cloud storages 50a to 50c. When the cloud storages 50a to 50c are not necessarily differentiated from each other, they may be referred to as cloud storages 50.

FIG. 1 illustrates three cloud storages 50. Alternatively, two cloud storages 50 or four cloud storages 50 or more may be provided.

The terminal apparatuses 10 are used when users who use the storage system 1 store data in cloud storages 50. In each terminal apparatus 10, a communication service application, which enables communication between users, may be installed so that the storage system 1 is available by using the communication application. As a terminal apparatus 10, for example, a desktop personal computer (PC), a notebook PC, a personal digital assistant, or the like may be used. The description below will be made by assuming that the terminal apparatus 10a is used by user Ua; the terminal apparatus 10b is used by user Ub; and the terminal apparatus 10c is used by user Uc.

The information processing apparatus 30 stores, in a cloud storage 50, data which a request to store is transmitted from a terminal apparatus 10. The information processing apparatus 30 also searches the cloud storages 50 for data, which a request to search for is transmitted from a terminal apparatus 10, and transmits the found data to the terminal apparatus 10. As the information processing apparatus 30, for example, a general-purpose personal computer may be used.

Cloud storage 50 stores data which an instruction to store is transmitted from the information processing apparatus 30. Cloud storage 50 also searches for data, which an instruction to search for is transmitted from the information processing apparatus 30, and transmits the found data to the information processing apparatus 30. The cloud storages 50a to 50c are also called storages Sa to Sc in the description below.

The communication line 80 is a communication unit used in information communication between the terminal apparatuses 10 and the information processing apparatus 30 and between the information processing apparatus 30 and the cloud storages 50. As the communication line 80, for example, the Internet may be used.

The Hardware Configuration of the Information Processing Apparatus

Figure 2:
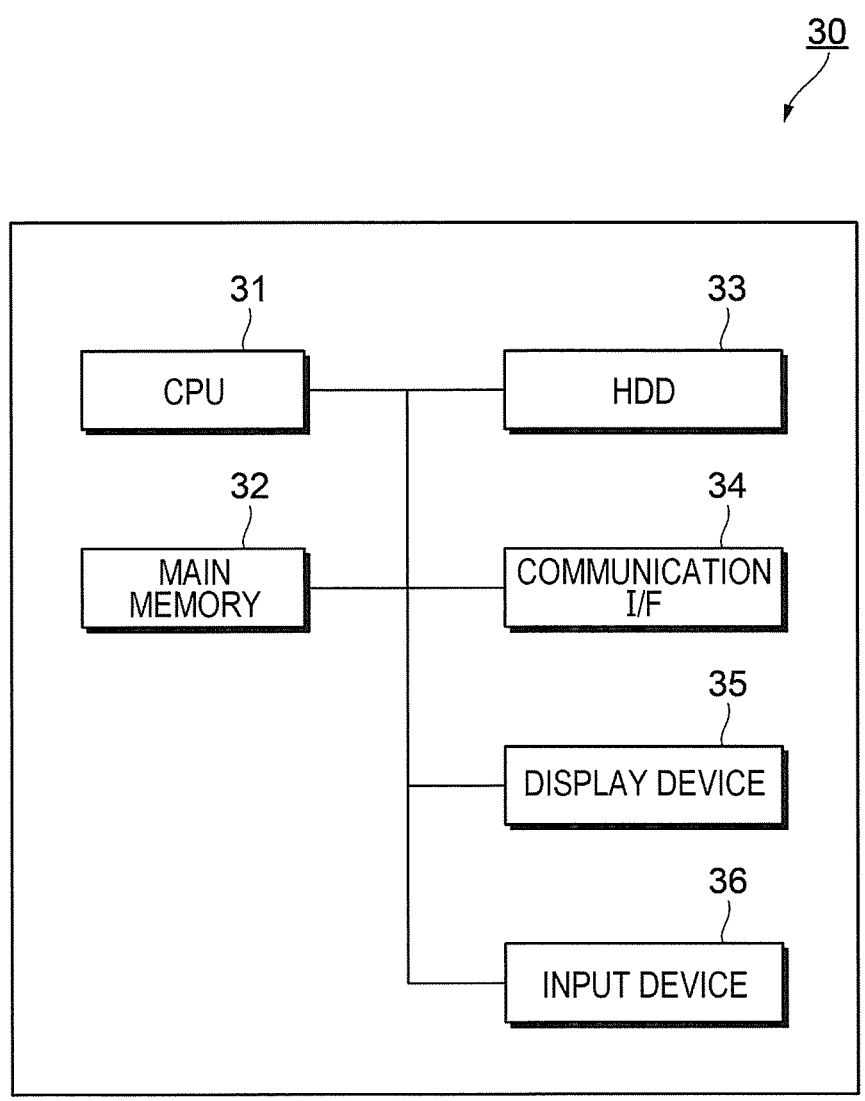
FIG. 2 is a diagram illustrating an exemplary hardware configuration of an information processing apparatus according to an exemplary embodiment of the present disclosure.

FIG. 2 is a diagram illustrating an exemplary hardware configuration of the information processing apparatus 30 according to the present exemplary embodiment. As illustrated in FIG. 2, the information processing apparatus 30 includes a central processing unit (CPU) 31, which is a computing unit, and a main memory 32 and a hard disk drive (HDD) 33 which are storage units. The CPU 31 runs various types of software, such as an operating system (OS) and applications, and implements various functions described below. The main memory 32 is a storage area for storing, for example, various types of software and data used in execution of the software. The HDD 33 is a storage area for storing, for example, input data for various types of software and output data from various types of software. The information processing apparatus 30 further includes a communication interface (I/F) 34 for communication with the outside, a display device 35 such as a display, and an input device 36 such as a keyboard and a mouse.

The Overview of the Present Exemplary Embodiment

The storage system 1 having such a configuration performs, for example, four types of operations in the present exemplary embodiment. These operations, which are regarded as operations performed by the information processing apparatus 30, are the four following operations.

In a first operation, the information processing apparatus 30 receives, from a user, data and data identification information for identifying the data, generates association information in which cloud-storage identification information for identifying a cloud storage 50 is associated with the data identification information, and stores the data in the cloud storage 50. The data identification information does not include cloud-storage identification information for identifying a cloud storage 50, which stores the data, among the cloud storages 50.

In a second operation, the information processing apparatus 30 receives data identification information from a user, obtains the attribute information of the data from a cloud storage 50 identified by using the cloud-storage identification information associated with the data identification information in association information, and presents the attribute information to the user. In this case, in response to a user's request to obtain the data by using its attribute information, the information processing apparatus 30 may obtain the data from the cloud storage 50 identified by using the cloud-storage identification information associated with the data identification information in the association information, and may present the data to the user.

In a third operation, in response to a different user's request to share association information, the information processing apparatus 30 presents the association information to the different user if the association information is permitted to be shared with the different user. In this case, the association information may further include association between data identification information and sharing permission information which indicates whether the data is permitted to be shared with a different user. If the sharing permission information indicates that the data is permitted to be shared with a different user, the information processing apparatus 30 may determine that the association information is permitted to be shared with the different user. In addition, the association information further includes association between data identification information and disclosure restriction information of which disclosure to a different user is restricted. The information processing apparatus 30 may present, to a different user, data excluding the disclosure restriction information in the association information. Alternatively, the third operation may be regarded as an operation in which, in response to a different user requesting association information, the information processing apparatus 30 does not present the association information to the different user if the association information is not permitted to be shared with the different user.

In a fourth operation, when data stored in a cloud storage 50 is changed, the information processing apparatus 30 changes association information in accordance with the change. In addition, in the fourth operation, assume the case in which the association information further includes association between registration information for a cloud storage 50 and data identification information. In this case, when the registration information is changed, the information processing apparatus 30 may change the registration information associated with data identification information in the association information.

The description will be made below by taking document files as exemplary data, taking document file names as exemplary data identification information, and taking storage names as exemplary cloud-storage identification information. The association information is called storage mapping information.

A change in data in the fourth operation may be any. The description will be made below by taking, as examples, a change of a document file name, a change of the storage location of a document file, and deletion of a document file.

The Functional Configuration of the Information Processing Apparatus

Figure 3:
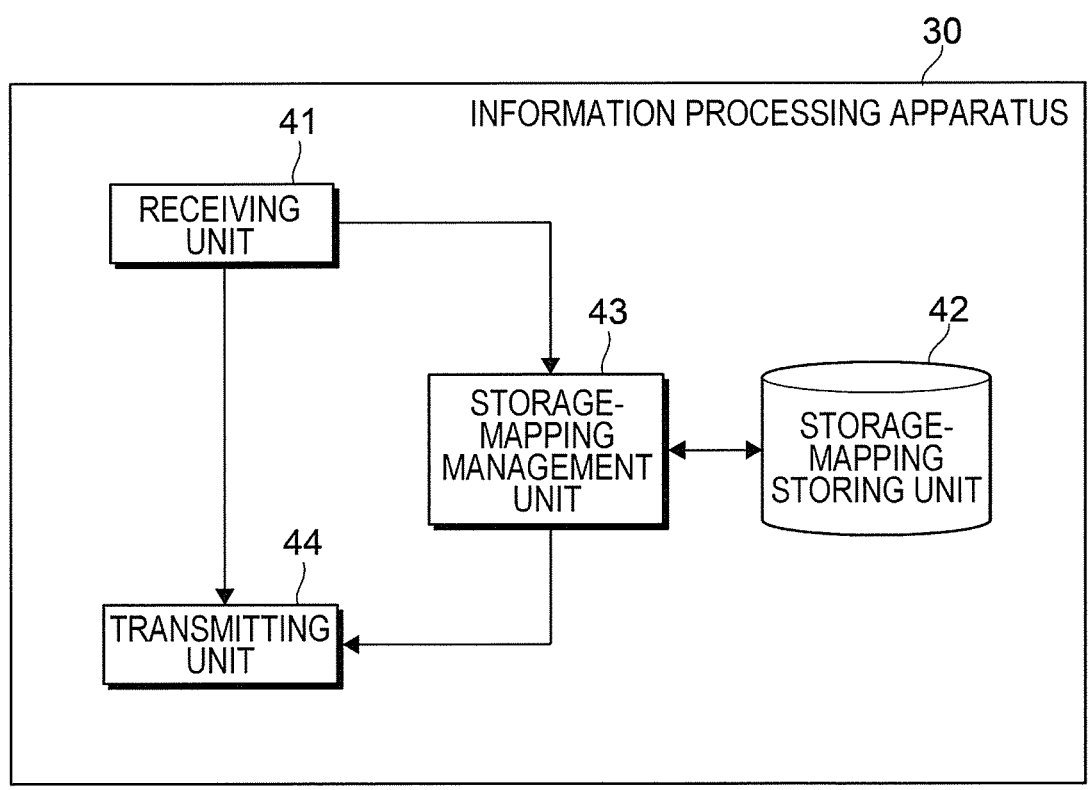
FIG. 3 is a block diagram illustrating an exemplary functional configuration of an information processing apparatus according to an exemplary embodiment of the present disclosure.

FIG. 3 is a block diagram illustrating an exemplary functional configuration of the information processing apparatus 30 according to the present exemplary embodiment. As illustrated in FIG. 3, the information processing apparatus 30 includes a receiving unit 41, a storage-mapping storing unit 42, a storage-mapping management unit 43, and a transmitting unit 44.

In the first operation performed by the information processing apparatus 30, the receiving unit 41 receives, from a terminal apparatus 10, a request to store a document file. The storage request includes a user ID, a document file, a document file name, a storage name, storage registration information, storage location information, and sharing permission information. Among these types of data, the user ID is information obtained from login information which is input to a terminal apparatus 10 by a user when the user is to use the storage system 1. The data other than the user ID is information which is directly input by the user to the terminal apparatus 10 when the user is to transmit the request to store the document file. More specifically, the user ID is information with which the information processing apparatus 30 identifies a unique user. The document file is the body of a document file. The document file name is the name of the document file which serves as exemplary identification information of the document file. The storage name is the name of a cloud storage 50 which serves as exemplary identification information of the cloud storage 50 which stores the document file. The storage registration information is registered in the cloud storage 50 which stores the document file, and is used in access to the cloud storage 50. The storage registration information includes a user ID (hereinafter referred to as a "storage user ID") and a password (hereinafter referred to as a "storage password") for logging in the cloud storage 50. The storage location information indicates the storage location of the document file in the cloud storage 50. The sharing permission information indicates whether the document file is to be permitted to be shared with a different user. An instruction to store a document file is transmitted to a cloud storage 50, and the receiving unit 41 receives, from the cloud storage 50, a notification about completion of storage of a document file.

In the second operation performed by the information processing apparatus 30, the receiving unit 41 receives, from a terminal apparatus 10, a request to search for a document file. The search request includes a user ID and a document file name. Among these types of data, the user ID is information obtained from login information which is input to the terminal apparatus 10 when a user is to use the storage system 1. The document file name is information which is directly input to the terminal apparatus 10 when the user is to transmit the request to search for the document file. An instruction to transfer the attribute information of the document file is transmitted to a cloud storage 50, and the receiving unit 41 receives the attribute information of the document file from the cloud storage 50. The attribute information of a document file indicates attributes of the document file other than the boy of the document file, and is, for example, the title and a thumbnail image of the document file. In addition, the receiving unit 41 receives, from a terminal apparatus 10, a request to download a document file. An instruction to download the document file is transmitted to a cloud storage 50, and the receiving unit 41 receives the body of the document file from the cloud storage 50. When the download of the document file is completed, the receiving unit 41 receives, from the cloud storage 50, a notification about completion of the download.

In the third operation performed by the information processing apparatus 30, the receiving unit 41 receives, from a terminal apparatus 10, a request for sharing of storage mapping information. The share request includes the user ID of a user (hereinafter referred to as a "share-requesting user") who requests sharing of storage mapping information, and the user ID of a user (hereinafter referred to as a "share-requested user") who is requested to cause the storage mapping information to be shared. Among these types of data, the user ID of the share-requesting user is information obtained from login information which is input to the terminal apparatus 10 when the share-requesting user is to use the storage system 1. The user ID of the share-requested user is information which is directly input to the terminal apparatus 10 when the share-requesting user is to transmit the request for sharing of storage mapping information. A request to confirm whether sharing of the storage mapping information with the share-requesting user is to be permitted is transmitted, and the receiving unit 41 receives, from the terminal apparatus 10, a response to the confirmation about whether sharing of the storage mapping information with the share-requesting user is to be permitted. In addition, the receiving unit 41 also performs processes in the first operation performed by the information processing apparatus 30.

In the fourth operation performed by the information processing apparatus 30, the receiving unit 41 receives, from a cloud storage 50, a notification about a change of the name of a document file. The notification about a change of the name of a document file includes the notification type indicating a change of the name of a document file, the document file name, before change, of the document file whose name has been changed, and the document file name after the change. The receiving unit 41 receives, from a cloud storage 50, a notification about a change of the storage location of a document file. The notification about a change of the storage location of a document file includes the notification type indicating a change of the storage location of a document file, the document file name of the document file whose storage location has been changed, and a file path after the change. In addition, the receiving unit 41 receives, from a cloud storage 50, a notification about deletion of a document file. The notification about deletion of a document file includes the notification type indicating deletion of a document file, and the document file name of the deleted document file. Further, the receiving unit 41 receives, from a cloud storage 50, a notification about a change of registration information of the cloud storage 50. The notification about a change of registration information of a cloud storage 50 includes the notification type indicating a change of storage registration information of the cloud storage 50, the storage name of the cloud storage 50, and the storage registration information after the change.

The storage-mapping storing unit 42 stores storage mapping information in which the document file name, the storage name, the storage registration information, the file path, and the sharing permission information are associated with each other.

FIG. 4 is a diagram illustrating exemplary storage mapping information stored in the storage-mapping storing unit 42. As illustrated in FIG. 4, the storage mapping information includes the document file name, the storage name, the storage registration information (the storage user ID and the storage password), the file path, and the sharing permission information which are associated with each other.

The first line in the storage mapping information indicates that document file Fa is stored in storage Sa; the storage user ID and the storage password of storage Sa are "AA" and "12341234", respectively; the file path is "http://www.sa-.com/ . . . /fa.pdf". The sharing permission information of document file Fa indicates "share". The term, "share", may indicate that document file Fa is permitted to be shared with all other users. The description is made below under the assumption that "share" indicates document file Fa is permitted to be shared with a different specific user.

The second line of the storage mapping information indicates that document file Fb is stored in storage Sb; the storage user ID and the storage password of storage Sb are "AB" and "34563456", respectively; the file path is "http://www.sb.com/ . . . /fb.pdf". The sharing permission information of document file Fb indicates "share". The term, "share", may indicate that document file Fb is permitted to be shared with all other users. The description will be made below under the assumption that document file Fb is permitted to be shared with a different specific user.

The third line of the storage mapping information indicates that document file Fc is stored in storage Sc; the storage user ID and the storage password of storage Sc are "AC" and "56785678", respectively; the file path is "http://www.sc.com/ . . . /fc.pdf". The sharing permission information of document file Fc indicates "not share". The term, "not share", may indicate that document file Fc is not permitted to be shared with a different specific user. The description will be made below under the assumption that document file Fc is not permitted to be shared with all other users.

The storage mapping information illustrated in FIG. 4 is, for example, storage mapping information for user Ua. Storage mapping information, having the same format, for user Ub and storage mapping information, having the same format, for user Uc (not illustrated) are stored in the storage-mapping storing unit 42.

The functional configuration of the information processing apparatus 30 according to the present exemplary embodiment will be continuously described by referring to FIG. 3 again.

The storage-mapping management unit 43 performs processes of managing storage mapping information, such as storage of new storage mapping information in the storage-mapping storing unit 42, update of storage mapping information stored in the storage-mapping storing unit 42, acquisition of storage mapping information stored in the storage-mapping storing unit 42, and deletion of storage mapping information stored in the storage-mapping storing unit 42.

That is, in the first operation performed by the information processing apparatus 30, the storage-mapping management unit 43 stores, in the storage-mapping storing unit 42, storage mapping information for the user ID included in a request to store a document file, which is received by the receiving unit 41. If the storage mapping information for the user ID, which is included in the storage request received by the receiving unit 41, has been stored in the storage-mapping storing unit 42, the storage-mapping management unit 43 updates the storage mapping information. Specifically, the storage-mapping management unit 43 sets, to the storage mapping information, the document file name, the storage name, the storage registration information, the file path, and the sharing permission information. As the document file name, the storage name, the storage registration information, and the sharing permission information among the types of set information, information included in the storage request received by the receiving unit 41 may be used. The file path may be generated from the address corresponding to the storage name included in the storage request received by the receiving unit 41, and from the storage location information included in the storage request received by the receiving unit 41.

In the second operation performed by the information processing apparatus 30, the storage-mapping management unit 43 specifies, in the storage-mapping storing unit 42, the storage mapping information for the user ID included in a request to search for a document file or a request to download a document file, which is received by the receiving unit 41, and obtains the storage name, the storage registration information, and the file path which are associated, in the storage mapping information, with the document file name included in the search request or the download request received by the receiving unit 41.

In the third operation performed by the information processing apparatus 30, the storage-mapping management unit 43 causes storage mapping information to be shared. Specifically, the storage-mapping management unit 43 specifies, in the storage-mapping storing unit 42, storage mapping information for the user ID of a share-requested user included in a share request received by the receiving unit 41, and associates the storage mapping information with the user ID of the share-requesting user included in the share request received by the receiving unit 41. The storage-mapping management unit 43 extracts, from the document files included in the storage mapping information for the user ID of the share-requested user, document files, whose sharing permission information is set to "share", as document files which are the targets of confirmation about whether sharing with the share-requesting user is to be permitted. In addition, the storage-mapping management unit 43 generates shared storage mapping information from the storage mapping information for the user ID of the share-requested user. The shared storage mapping information is obtained by deleting, from the storage mapping information for the user ID of the share-requested user, lines for the document files whose sharing permission information is set to "not share" and lines for the document files, of which sharing is rejected by the share-requested user, among the document files whose sharing permission information is set to "share". The shared storage mapping information is such that the storage registration information in the storage mapping information for the user ID of the share-requested user is encrypted so as not to be specified by the share-requesting user. Alternatively, the shared storage mapping information may be such that the storage registration information may be deleted from the storage mapping information for the user ID of the share-requested user. In the present exemplary embodiment, as exemplary disclosure restriction information of which disclosure to a different user is restricted, the storage registration information is used.

In the fourth operation performed by the information processing apparatus 30, in response to the receiving unit 41's reception of a notification about a change of a document file name, the storage-mapping management unit 43 changes the document file name in the storage mapping information stored in the storage-mapping storing unit 42. Specifically, on the basis of the notification type received by the receiving unit 41, the receiving unit 41 determines that a notification about a change of a document file name has been received. Among the pieces of storage mapping information stored in the storage-mapping storing unit 42, in the storage mapping information in which the document file name before change which is received by the receiving unit 41 is set, the document file name before change is changed to the document file name after change which is received by the receiving unit 41. In response to the receiving unit 41's reception of a notification about a change of the storage location of a document file, the file path of the document file in the storage mapping information stored in the storage-mapping storing unit 42 is changed. Specifically, on the basis of the notification type received by the receiving unit 41, the receiving unit 41 determines that a notification about a change of the storage location of a document file has been received. Among the pieces of storage mapping information stored in the storage-mapping storing unit 42, in the storage mapping information in which the document file name received by the receiving unit 41 is set, the file path corresponding to the document file name is changed to the file path after change which is received by the receiving unit 41. Further, in response to the receiving unit 41's reception of a notification about deletion of a document file, lines in the storage mapping information stored in the storage-mapping storing unit 42 are deleted. Specifically, on the basis of the notification type received by the receiving unit 41, the receiving unit 41 determines that a notification about deletion of a document file has been received. Among the pieces of storage mapping information stored in the storage-mapping storing unit 42, in the storage mapping information in which the document file name received by the receiving unit 41 is set, lines including the document file name are deleted. Furthermore, in response to the receiving unit 41's reception of a notification about a change of the registration information of a cloud storage 50, the storage registration information in the storage mapping information stored in the storage-mapping storing unit 42 is changed. Specifically, on the basis of the notification type received by the receiving unit 41, the receiving unit 41 determines that a notification about a change of the registration information of a cloud storage 50 has been received. Among the pieces of storage mapping information stored in the storage-mapping storing unit 42, in the storage mapping information in which the storage name received by the receiving unit 41 is set, the storage registration information corresponding to the storage name is changed to the storage registration information after change which is received by the receiving unit 41.

In the first operation performed by the information processing apparatus 30, in response to the receiving unit 41's reception of a request to store a document file, the transmitting unit 44 transmits, to a cloud storage 50, an instruction to store the document file. Specifically, the transmitting unit 44 accesses the cloud storage 50 for the storage name associated with the document file in the storage mapping information, by using the storage registration information associated with the document file in the storage mapping information, and transmits, to the cloud storage 50, an instruction to store the document file in the file path associated with the document file in the storage mapping information. In response to the receiving unit 41's reception of a notification about completion of storage of the document file, the transmitting unit 44 transmits, to the terminal apparatus 10, a response indicating completion of storage of the document file.

In the second operation performed by the information processing apparatus 30, in response to the receiving unit 41's reception of a request to search for a document file, the transmitting unit 44 transmits, to a cloud storage 50 an instruction to transfer of attribute information of the document file. Specifically, the transmitting unit 44 accesses the cloud storage 50 for the storage name associated with the document file in the storage mapping information, by using the storage registration information associated with the document file in the storage mapping information, and transmits, to the cloud storage 50, an instruction to transfer the attribute information of the document file from the file path associated with the document file in the storage mapping information. In response to the receiving unit 41's reception of the attribute information of the document file, the transmitting unit 44 transmits the attribute information to the terminal apparatus 10. In addition, in response to the receiving unit 41's reception of a request to download a document file, the transmitting unit 44 transmits, to a cloud storage 50, an instruction to download the document file. Specifically, the transmitting unit 44 accesses the cloud storage 50 for the storage name associated with the document file in the storage mapping information, by using the storage registration information associated with the document file in the storage mapping information, and transmits, to the cloud storage 50, an instruction to download the document file from the file path associated with the document file in the storage mapping information. In response to the receiving unit 41's reception of the body of the document file, the transmitting unit 44 transmits the body to the terminal apparatus 10. In response to the receiving unit 41's reception of a notification about completion of download of the document file, the transmitting unit 44 transmits, to the terminal apparatus 10, a response indicating completion of download of the document file.

In the third operation performed by the information processing apparatus 30, the transmitting unit 44 transmits, to the terminal apparatus 10 of the share-requested user, a request to confirm whether sharing of the storage mapping information for the user ID of the share-requested user with the share-requesting user is to be permitted. The transmitting unit 44 transmits, to the terminal apparatus 10, the shared storage mapping information generated by the storage-mapping management unit 43. Further, the transmitting unit 44 performs processes in the first operation performed by the information processing apparatus 30.

Operations of the Storage System

Figure 5:
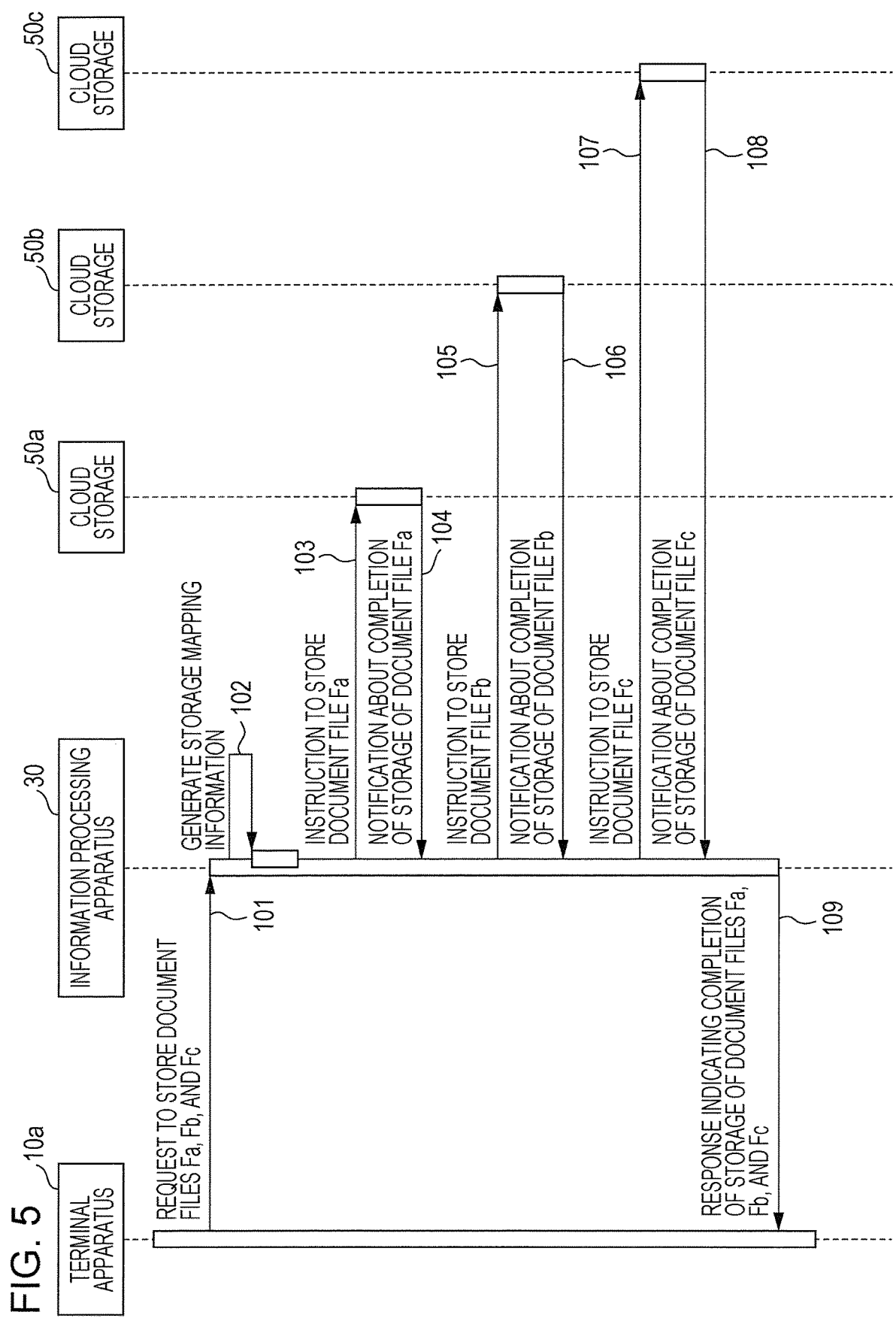
FIG. 5 is a sequence chart of an exemplary process flow in a first operation performed by a storage system according to an exemplary embodiment of the present disclosure.

FIG. 5 is a sequence chart of an exemplary process flow in the first operation performed by the storage system 1 according to the present exemplary embodiment. The description will be made by taking, as an example, the case in which user Ua stores document files Fa, Fb, and Fc in the cloud storages 50a, 50b, and 50c, respectively.

As illustrated in FIG. 5, the terminal apparatus 10a transmits, to the information processing apparatus 30, a request to store document files Fa, Fb, and Fc. In the information processing apparatus 30, the receiving unit 41 receives the request (step 101). The request to store document files Fa, Fb, and Fc includes the user ID of user Ua. The request to store document file Fa includes the document file name of document file Fa, the storage name and the storage registration information of the cloud storage 50a, the storage location information of document file Fa in the cloud storage 50a, and the sharing permission information of document file Fa. The request to store document file Fb includes the document file name of document file Fb, the storage name and the storage registration information of the cloud storage 50b, the storage location information of document file Fb in the cloud storage 50b, and the sharing permission information of document file Fb. The request to store document file Fc includes the document file name of document file Fc, the storage name and the storage registration information of the cloud storage 50c, the storage location information of document file Fc in the cloud storage 50c, and the sharing permission information of document file Fc.

In the information processing apparatus 30, the storage-mapping management unit 43 uses information, which is included in the storage request received in step 101, to generate storage mapping information (step 102). Specifically, storage mapping information is generated for the user ID of user Ua included in the request to store document files Fa, Fb, and Fc. The storage mapping information includes a line in which the document file name of document file Fa, the storage name and the storage registration information of the cloud storage 50a, the file path of document file Fa, and the sharing permission information of document file Fa are associated with each other. The storage mapping information includes a line in which the document file name of document file Fb, the storage name and the storage registration information of the cloud storage 50b, the file path of document file Fb, and the sharing permission information of document file Fb are associated with each other. The storage mapping information includes a line in which the document file name of document file Fc, the storage name and the storage registration information of the cloud storage 50c, the file path of document file Fc, and the sharing permission information of document file Fc are associated with each other. Among these pieces of data, the file paths of document files Fa, Fb, and Fc may be generated from the addresses corresponding to the storage names of the cloud storages 50a, 50b, and 50b included in the storage requests, and from storage location information of document files Fa, Fb, and Fc included in the storage requests. As the other information, information included in the storage requests may be used as it is. The storage mapping information is stored in the storage-mapping storing unit 42.

In the information processing apparatus 30, the transmitting unit 44 transmits, to the cloud storage 50a, an instruction to store document file Fa (step 103). Specifically, the transmitting unit 44 logs in the cloud storage 50a for storage name Sa associated with document file Fa in the storage mapping information, by using the storage registration information associated with document file Fa in the storage mapping information, and transmits, to the cloud storage 50a, the instruction to store document file Fa in the file path associated with document file Fa in the storage mapping information.

The cloud storage 50a stores document file Fa in the specified file path, and transmits a notification about completion of storage of document file Fa to the information processing apparatus 30. In the information processing apparatus 30, the receiving unit 41 receives the notification about completion of storage of document file Fa (step 104).

In the information processing apparatus 30, the transmitting unit 44 transmits, to the cloud storage 50b, an instruction to store document file Fb (step 105). Specifically, the transmitting unit 44 logs in the cloud storage 50b for storage name Sb associated with document file Fb in the storage mapping information, by using the storage registration information associated with document file Fb in the storage mapping information, and transmits, to the cloud storage 50b, the instruction to store document file Fb in the file path associated with document file Fb in the storage mapping information.

The cloud storage 50b stores document file Fb in the specified file path, and transmits, to the information processing apparatus 30, a notification about completion of storage of document file Fb. In the information processing apparatus 30, the receiving unit 41 receives the notification about completion of storage of document file Fb (step 106).

In the information processing apparatus 30, the transmitting unit 44 transmits, to the cloud storage 50c, an instruction to store document file Fc (step 107). Specifically, the transmitting unit 44 logs in the cloud storage 50c for storage name Sc associated with document file Fc in the storage mapping information, by using the storage registration information associated with document file Fc in the storage mapping information, and transmits, to the cloud storage 50c, the instruction to store document file Fc in the file path associated with document file Fc in the storage mapping information.

The cloud storage 50c stores document file Fc in the specified file path, and transmits, to the information processing apparatus 30, a notification about completion of storage of document file Fc. In the information processing apparatus 30, the receiving unit 41 receives the notification about completion of storage of document file Fc (step 108).

Then, in the information processing apparatus 30, the transmitting unit 44 transmits, to the terminal apparatus 10a, a response indicating completion of storage of document files Fa, Fb, and Fc (step 109).

Figure 6:
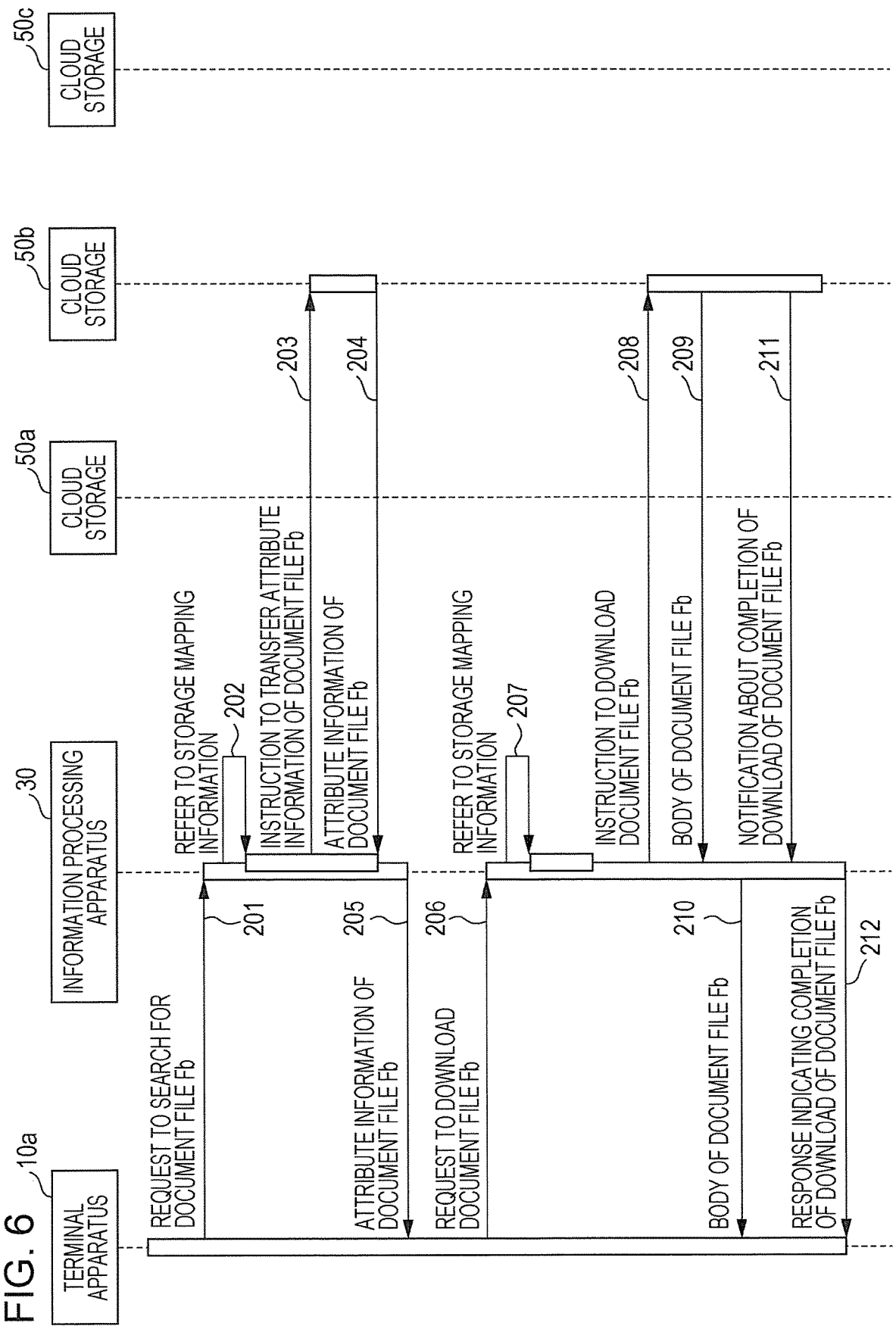
FIG. 6 is a sequence chart of an exemplary process flow in a second operation performed by a storage system according to an exemplary embodiment of the present disclosure.

FIG. 6 is a sequence chart of an exemplary process flow in the second operation performed by the storage system 1 according to the present exemplary embodiment. The description will be made by taking, as an example, the case in which user Ua searches the cloud storage 50b for document file Fb for download.

As illustrated in FIG. 6, the terminal apparatus 10a transmits, to the information processing apparatus 30, a request to search for document file Fb. In the information processing apparatus 30, the receiving unit 41 receives the request (step 201). The request to search for document file Fb includes the user ID of user Ua and the document file name of document file Fb.

In the information processing apparatus 30, the storage-mapping management unit 43 uses information, which is included in the search request received in step 201, to refer to the storage mapping information (step 202). Specifically, the storage-mapping management unit 43 obtains the storage mapping information for the user ID of user Ua included in the request to search for document file Fb. Storage name Sb and the storage registration information of the cloud storage 50b, and the file path of document file Fb which are associated with document file Fb in the storage mapping information are obtained.

In the information processing apparatus 30, the transmitting unit 44 transmits, to the cloud storage 50b, an instruction to transfer the attribute information of document file Fb (step 203). Specifically, the transmitting unit 44 logs in the cloud storage 50b for storage name Sb obtained in step 202, by using the storage registration information obtained in step 202, accesses the file path obtained in step 202, and transmits an instruction to transfer the attribute information of document file Fb.

The cloud storage 50b retrieves the attribute information of document file Fb from the specified file path, and transmits the attribute information to the information processing apparatus 30. In the information processing apparatus 30, the receiving unit 41 receives the attribute information of document file Fb (step 204).

Then, in the information processing apparatus 30, the transmitting unit 44 transmits, to the terminal apparatus 10a, the attribute information of document file Fb (step 205). Thus, the attribute information of document file Fb is displayed on the screen of the terminal apparatus 10a.

When user Ua requests download of document file Fb on the screen, the terminal apparatus 10a transmits, to the information processing apparatus 30, a request to download document file Fb. In the information processing apparatus 30, the receiving unit 41 receives the request (step 206). The request to download document file Fb includes the user ID of user Ua and the document file name of document file Fb.

In the information processing apparatus 30, the storage-mapping management unit 43 uses information, which is included in the download request received in step 206, to refer to the storage mapping information (step 207). Specifically, the storage-mapping management unit 43 obtains the storage mapping information for the user ID of user Ua included in the request to download document file Fb. Storage name Sb and the storage registration information of the cloud storage 50b, and the file path of document file Fb which are associated with document file Fb in the storage mapping information are obtained.

In the information processing apparatus 30, the transmitting unit 44 transmits, to the cloud storage 50b, an instruction to download document file Fb (step 208). Specifically, the transmitting unit 44 logs in the cloud storage 50b for storage name Sb obtained in step 207, by using the storage registration information obtained in step 207, accesses the file path obtained in step 207, and transmits an instruction to download document file Fb.

The cloud storage 50b retrieves the body of document file Fb from the specified file path, and transmits the body to the information processing apparatus 30. In the information processing apparatus 30, the receiving unit 41 receives the body of the document file Fb (step 209).

Then, in the information processing apparatus 30, the transmitting unit 44 transmits the body of the document file Fb to the terminal apparatus 10a (step 210).

After that, when transmission of the body of document file Fb is completed, the cloud storage 50b transmits, to the information processing apparatus 30, a notification about completion of download of document file Fb. In the information processing apparatus 30, the receiving unit 41 receives the notification (step 211).

In the information processing apparatus 30, the transmitting unit 44 transmits, to the terminal apparatus 10a, a response indicating completion of download of document file Fb (step 212).

Figure 7:
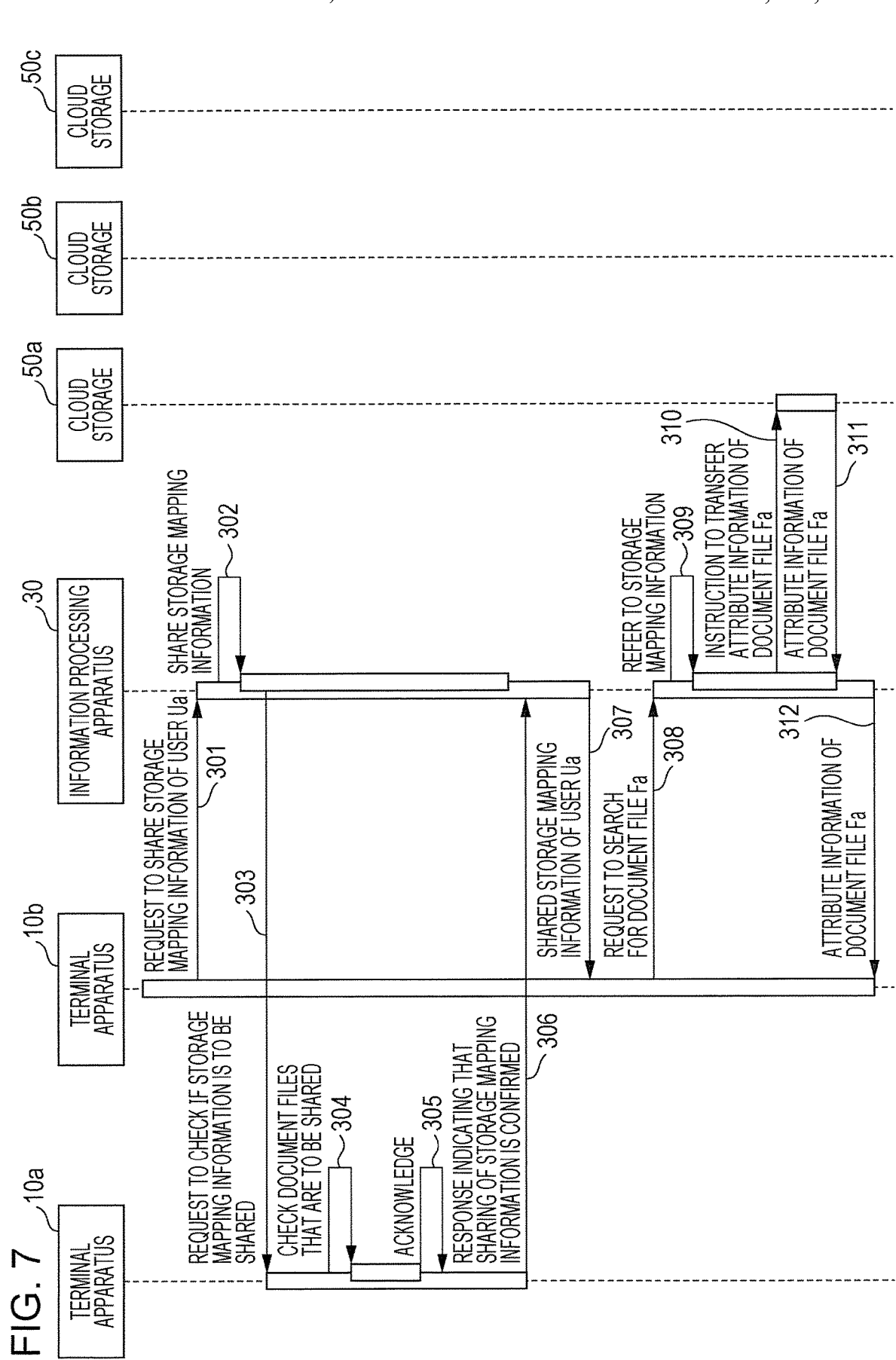
FIG. 7 is a sequence chart of an exemplary process flow in a third operation performed by a storage system according to an exemplary embodiment of the present disclosure.

FIG. 7 is a sequence chart of an exemplary process flow in the third operation performed by the storage system 1 according to the present exemplary embodiment. The description will be made by taking, as an example, the case in which the storage mapping information of user Ua is shared with user Ub and in which user Ub searches the cloud storage 50a for document file Fa.

As illustrated in FIG. 7, the terminal apparatus 10b transmits, to the information processing apparatus 30, a request for sharing of the storage mapping information of user Ua. In the information processing apparatus 30, the receiving unit 41 receives the request (step 301). The request for sharing of the storage mapping information of user Ua includes the user ID of user Ub, as the user ID of a share-requesting user, and the user ID of user Ua, as the user ID of a share-requested user.

In the information processing apparatus 30, the storage-mapping management unit 43 uses information, which is included in the share request received in step 301, to cause sharing of the storage mapping information (step 302). Specifically, the storage-mapping management unit 43 stores, in the storage-mapping storing unit 42, the user ID of user Ub, which is included in the request for sharing of the storage mapping information of user Ua and which serves as the user ID of a different user who causes the storage mapping information to be shared, in association with the storage mapping information of user Ua. The storage-mapping management unit 43 specifies document files Fa and Fb, as document files whose sharing permission information is set to "share", from the storage mapping information of user Ua stored in the storage-mapping storing unit 42.

In the information processing apparatus 30, the transmitting unit 44 transmits, to the terminal apparatus 10a, a request to check if the storage mapping information of user Ua is to be shared (step 303). Specifically, the transmitting unit 44 notifies the user ID of user Ub who is the share-requesting user included in the share request received in step 301, and document files Fa and Fb which are specified in step 302, and transmits a request to check if sharing of document files Fa and Fb with user Ub is to be permitted. That is, the term, "share", in sharing permission information in the storage mapping information stored in the storage-mapping storing unit 42 does not indicate with which user the sharing is permitted. Thus, a request to check if user Ua is to permit sharing with user Ub is transmitted.

The terminal apparatus 10a checks if the document files are to be shared (step 304). Specifically, the terminal apparatus 10a asks user Ua if sharing of document files Fa and Fb with user Ub is to be permitted. When user Ua inputs a confirmation indicating that sharing of document files Fa and Fb with user Ub is to be permitted, the terminal apparatus 10a receives the confirmation input.

The terminal apparatus 10a performs acknowledgement (step 305). Specifically, the terminal apparatus 10a asks user Ua if the confirmation about whether sharing of document files Fa and Fb with user Ub is to be permitted is acknowledged. When user Ua inputs acknowledgement, the terminal apparatus 10a receives the acknowledgement input.

The terminal apparatus 10a transmits, to the information processing apparatus 30, a response indicating the confirmation of sharing of the storage mapping information of user Ua. In the information processing apparatus 30, the transmitting unit 44 receives the response (step 306).

The information processing apparatus 30 transmits, to the terminal apparatus 10b, the shared storage mapping information of user Ua (step 307). Specifically, the storage-mapping management unit 43 deletes, from the storage mapping information of user Ua stored in the storage-mapping storing unit 42, lines for document files whose sharing permission information is set to "not share". The storage-mapping management unit 43 deletes, from the storage mapping information of user Ua stored in the storage-mapping storing unit 42, lines for document files of which sharing with user Ub is not permitted in the response about confirmation of sharing which is received in step 306, among the document files whose sharing permission information is set to "share". The storage-mapping management unit 43 encrypts the storage registration information in the storage mapping information of user Ua, which is stored in the storage-mapping storing unit 42, so that user Ub does not view the storage registration information. Alternatively, the storage registration information may be deleted from the storage mapping information of user Ua stored in the storage-mapping storing unit 42. The transmitting unit 44 transmits the shared storage mapping information of user Ua to the terminal apparatus 10b.

After that, the terminal apparatus 10b transmits, to the information processing apparatus 30, a request to search for document file Fa. In the information processing apparatus 30, the receiving unit 41 receives the request (step 308). The request to search for document file Fa includes the user ID of user Ub and the document file name of document file Fa.

In the information processing apparatus 30, the storage-mapping management unit 43 uses information, which is included in the search request received in step 308, to refer to the storage mapping information (step 309). Specifically, the storage-mapping management unit 43 obtains the storage mapping information for the user ID of user Ub included in the request to search for document file Fa. The storage-mapping management unit 43 determines whether information about document file Fa is registered in the storage mapping information. If it is determined that information about document file Fa is not registered in the storage mapping information, pieces of storage mapping information of different users which are associated with the user ID of user Ub are obtained. Storage name Sa and the storage registration information of the cloud storage 50*a*, and the file path of document file Fa which are associated with document file Fa in any piece of the storage mapping information are obtained.

In the information processing apparatus 30, the transmitting unit 44 transmits, to the cloud storage 50*a*, an instruction to transfer the attribute information of document file Fa (step 310). Specifically, the transmitting unit 44 logs in the cloud storage 50*a* for storage name Sa obtained in step 309, by using the storage registration information obtained in step 309, accesses the file path obtained in step 309, and transmits the instruction to transfer the attribute information of document file Fa.

The cloud storage 50*a* retrieves the attribute information of document file Fa from the specified file path, and transmits the attribute information to the information processing apparatus 30. In the information processing apparatus 30, the receiving unit 41 receives the attribute information of document file Fa (step 311).

In the information processing apparatus 30, the transmitting unit 44 transmits the attribute information of document file Fa to the terminal apparatus 10*b* (step 312). Thus, the attribute information of document file Fa is displayed on the screen of the terminal apparatus 10*b*.

After that, as illustrated in FIG. 6, the terminal apparatus 10*b* may transmit, to the information processing apparatus 30, a request to download document file Fa. The information processing apparatus 30 may download document file Fa from the cloud storage 50*a*, and may transmit document file Fa to the terminal apparatus 10*b*.

Additionally, as illustrated in FIG. 5, the terminal apparatus 10*b* may store a new document file in a cloud storage 50, and may register information about the new document file in the storage mapping information of user Ua.

Figure 8:
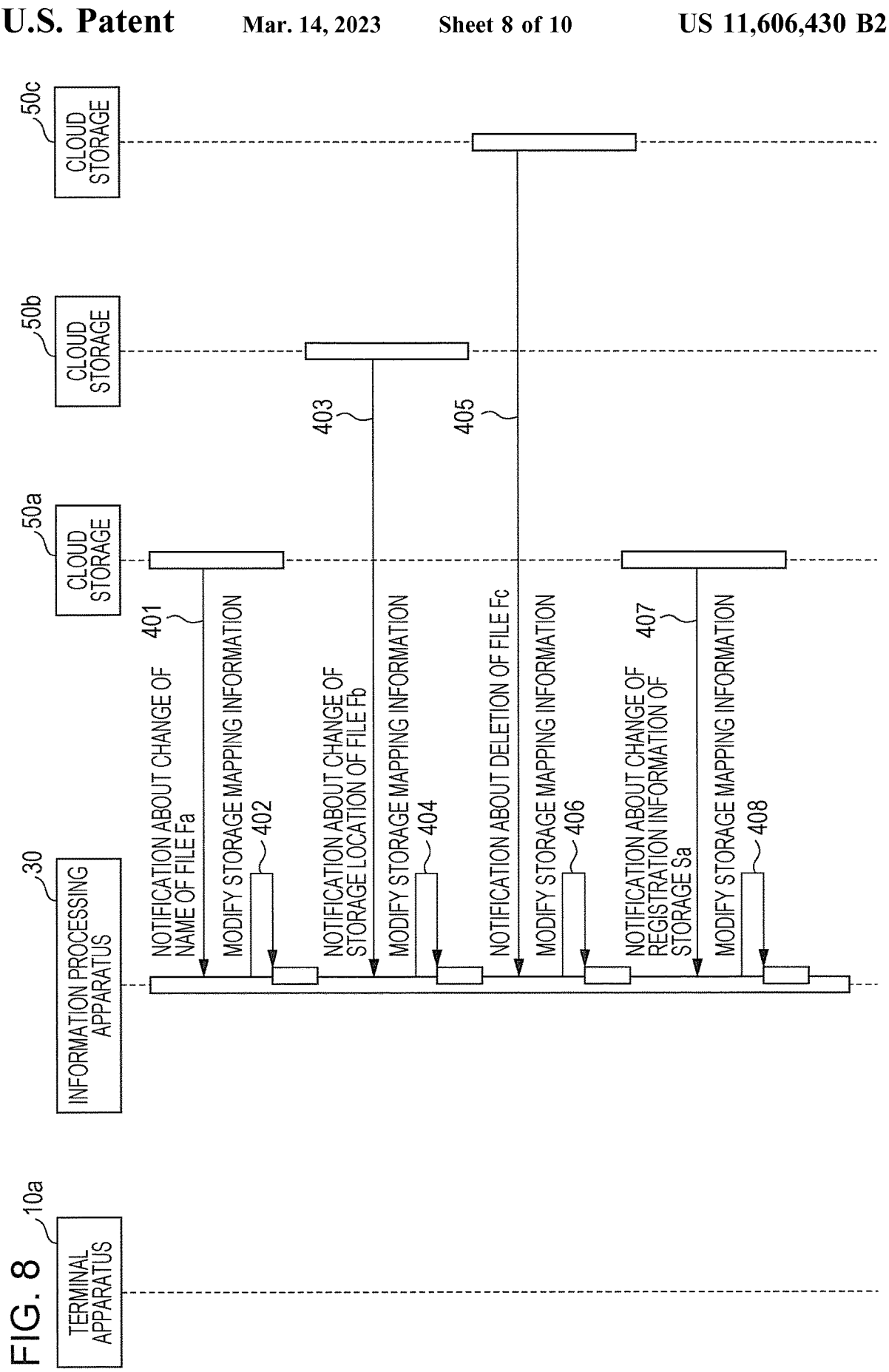
FIG. 8 is a sequence chart of an exemplary process flow in a fourth operation performed by a storage system according to an exemplary embodiment of the present disclosure.

FIG. 8 is a sequence chart of an exemplary process flow in the fourth operation performed by the storage system 1 according to the present exemplary embodiment. The description will be made by taking, as an example, the case in which the document file name of document file Fa stored in the cloud storage 50*a* is changed; the storage location of document file Fb stored in the cloud storage 50*b* is then changed; after that, document file Fc stored in the cloud storage 50*c* is deleted; finally, the storage registration information of the cloud storage 50*a* is changed.

As illustrated in FIG. 8, the cloud storage 50*a* transmits, to the information processing apparatus 30, a notification about a change of the name of document file Fa. In the information processing apparatus 30, the receiving unit 41 receives the notification (step 401). The notification about a change of the name of document file Fa includes the document file name, before change, of document file Fa, and the document file name, after change, of document file Fa. The determination as to whether the notification received in step 401 is a notification about a change of a name may be made on the basis of the notification type which is set in the notification data.

In the information processing apparatus 30, the storage-mapping management unit 43 modifies the storage mapping information stored in the storage-mapping storing unit 42 (step 402). Specifically, among the pieces of storage mapping information stored in the storage-mapping storing unit 42, in the storage mapping information in which the document file name, before change, of document file Fa, which is included in the notification about a change of a name received in step 401, is set, the storage-mapping management unit 43 modifies the document file name before change to the document file name, after change, of document file Fa which is included in the notification about a change of a name, which is received in step 401.

Then, the cloud storage 50*b* transmits, to the information processing apparatus 30, a notification about a change of the storage location of document file Fb. In the information processing apparatus 30, the receiving unit 41 receives the notification (step 403). The notification about a change of the storage location of document file Fb includes the document file name of document file Fb and the changed file path of document file Fb. The determination as to whether the notification received in step 403 is a notification about a change of a storage location may be made on the basis of the notification type which is set in the notification data.

In the information processing apparatus 30, the storage-mapping management unit 43 modifies the storage mapping information stored in the storage-mapping storing unit 42 (step 404). Specifically, among the pieces of storage mapping information stored in the storage-mapping storing unit 42, in the storage mapping information in which the document file name of document file Fb, which is included in the notification about a change of a storage location received in step 403, is set, the storage-mapping management unit 43 modifies the file path corresponding to the document file name, to the changed file path of document file Fb which is included in the notification about a change of a storage location, which is received in step 401.

Then, the cloud storage 50*c* transmits, to the information processing apparatus 30, a notification about deletion of document file Fc. In the information processing apparatus 30, the receiving unit 41 receives the notification (step 405). The notification about deletion of document file Fc includes the document file name of document file Fc. The determination as to whether the notification received in step 405 is a delete notification may be made on the basis of the notification type which is set in the notification data.

In the information processing apparatus 30, the storage-mapping management unit 43 modifies the storage mapping information stored in the storage-mapping storing unit 42 (step 406). Specifically, among the pieces of storage mapping information stored in the storage-mapping storing unit 42, in the storage mapping information in which the document file name of document file Fc, which is included in the delete notification received in step 405, is set, the storage-mapping management unit 43 deletes the lines including the document file name.

After that, the cloud storage 50*a* transmits, to the information processing apparatus 30, a notification about a change of registration information. In the information processing apparatus 30, the receiving unit 41 receives the notification (step 407). The notification about a change of registration information includes the storage name of cloud storage 50*a*, and changed storage registration information of the cloud storage 50*a*. The determination as to whether the notification received in step 407 is a notification about a change of registration information may be made on the basis of the notification type which is set in the notification data.

In the information processing apparatus 30, the storage-mapping management unit 43 modifies the storage mapping information stored in the storage-mapping storing unit 42 (step 408). Specifically, among the pieces of storage mapping information stored in the storage-mapping storing unit 42, in the storage registration information in which the storage name of the cloud storage 50a, which is included in the notification about a change of registration information received in step 407, is set, the storage-mapping management unit 43 modifies the storage registration information corresponding to the storage name, to the changed storage registration information included in the notification about a change of registration information which is received in step 407.

Exemplary Screens of a Terminal Apparatus

Figure 9:
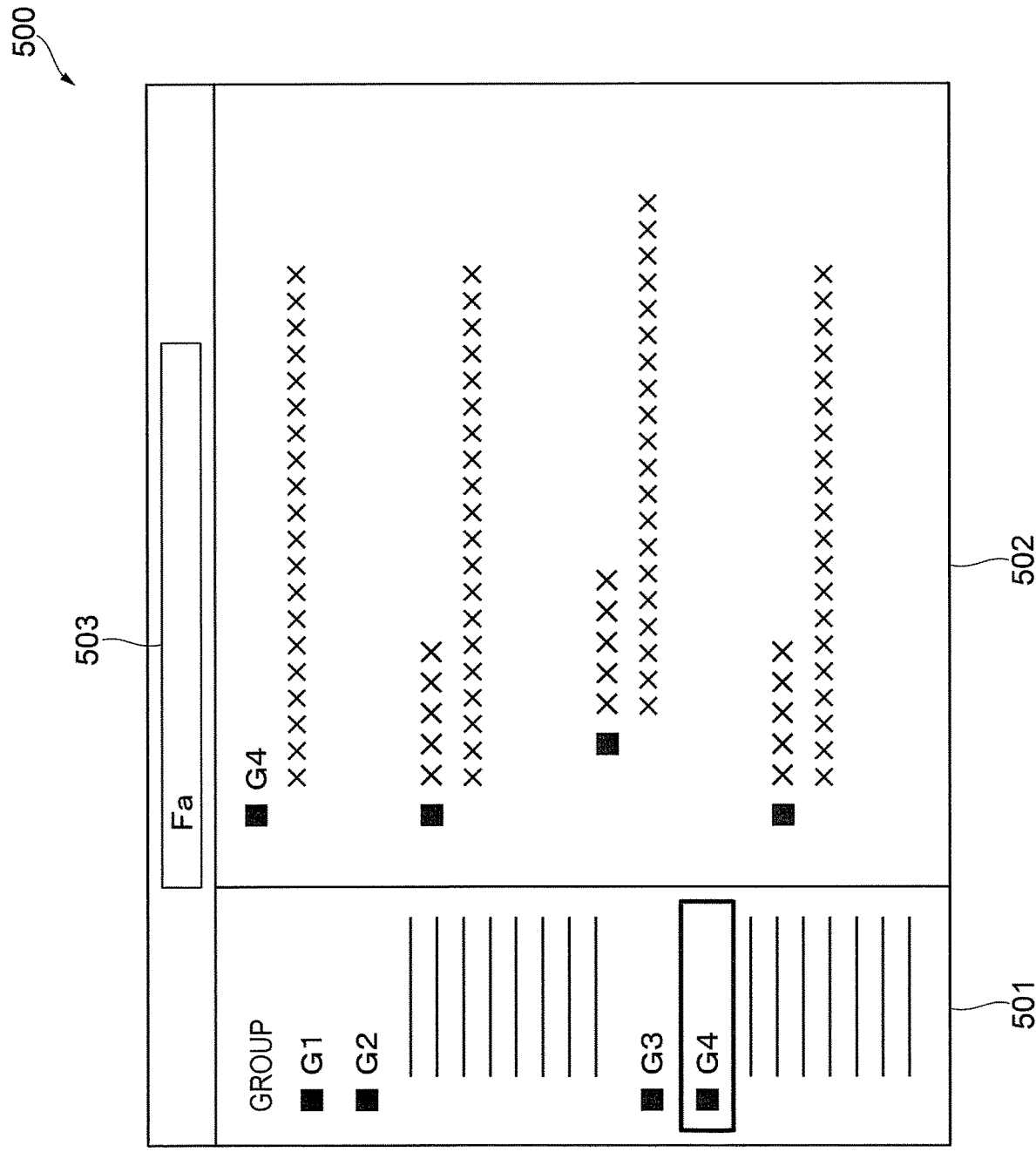
FIG. 9 is a diagram illustrating an exemplary screen displayed when a terminal apparatus transmits, to an information processing apparatus, a request to search for a document file, in a storage system according to an exemplary embodiment of the present disclosure.

FIG. 9 is a diagram illustrating an exemplary screen displayed when the terminal apparatus 10a is to transmit, to the information processing apparatus 30, a request to search for a document file, in the storage system 1 according to the present exemplary embodiment. FIG. 9 illustrates an exemplary communication screen 500 displayed by a communication service application on the terminal apparatus 10a used by user Ua. The communication screen 500 includes display areas 501 and 502 and an input area 503. In the display area 501, a list of groups, to which user Ua belongs, is displayed. In the display area 502, the content of communication performed between members of group G4 (surrounded by using a bold line) selected in the display area 501 is displayed. In this state, user Ua switches the communication service application to the document-file search mode, and inputs a document file name in the input area 503. This example indicates the state in which user Ua inputs a document file name, "Fa", in the input area 503. Thus, the terminal apparatus 10a invokes an application programming interface (API) of the information processing apparatus 30, and requests a search for document file Fa from the information processing apparatus 30.

Figure 10:
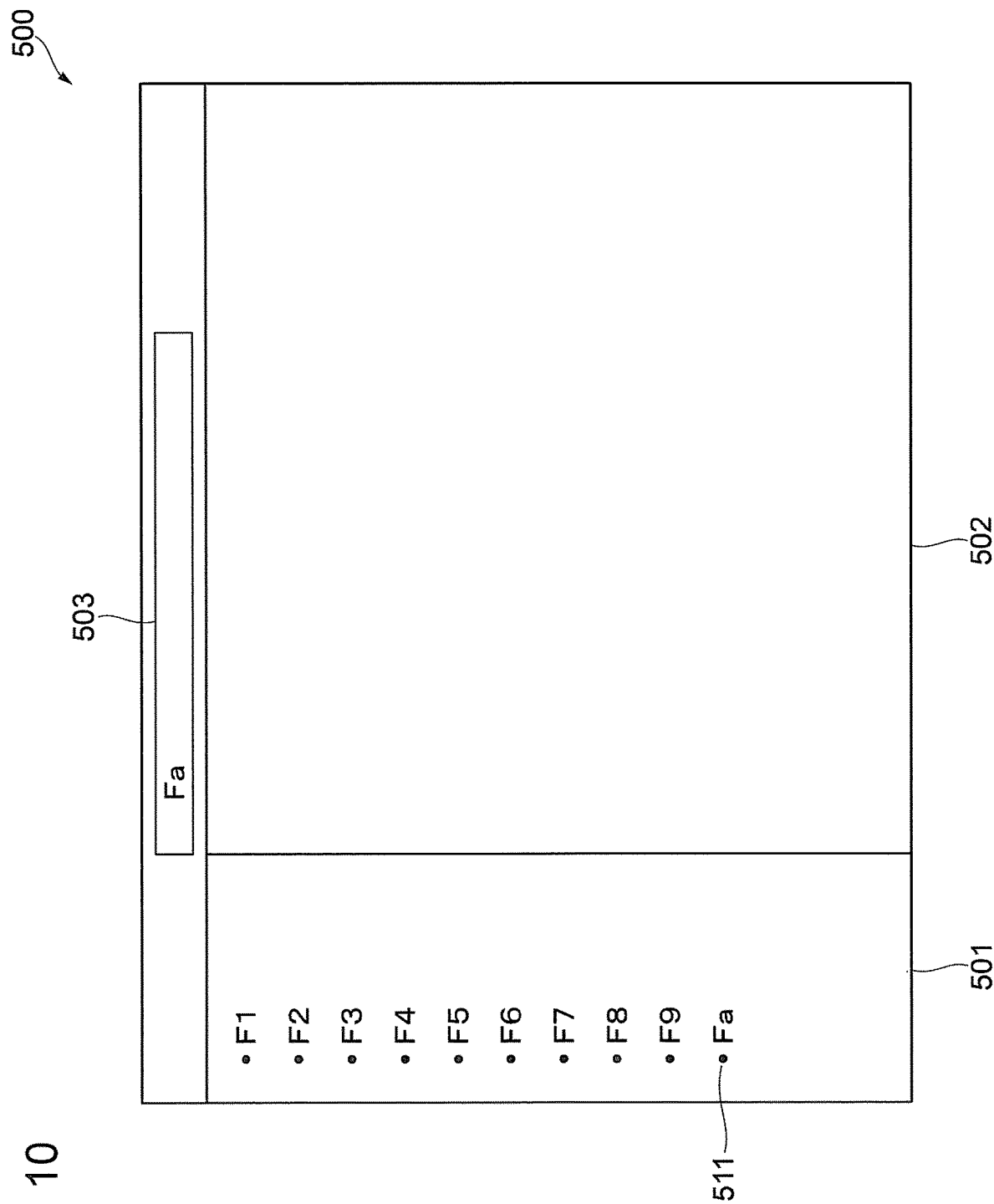
FIG. 10 is diagram illustrating an exemplary screen displayed when a terminal apparatus receives, from an information processing apparatus, attribute information of a document file, in a storage system according to an exemplary embodiment of the present disclosure.

FIG. 10 is a diagram illustrating an exemplary screen displayed when the terminal apparatus 10a receives the attribute information of a document file from the information processing apparatus 30, in the storage system 1 according to the present exemplary embodiment. As illustrated in FIG. 10, the search result is displayed in the display area 501. As an item 511, a document file name, "Fa", is displayed. When user Ua selects the item 511, document file Fa is downloaded from the cloud storage 50a, and is displayed in the display area 502.

The Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

A Program

The processes performed by the information processing apparatus 30 in the present exemplary embodiment is prepared as a program such as application software.

That is, the program for implementing the present exemplary embodiment is regarded as a program causing a computer to implement the following functions: a function of receiving, from a user, data and data identification information for identifying the data, the data identification information excluding cloud-storage identification information for identifying a cloud storage, the cloud storage storing the data and being among multiple cloud storages; a function of generating association information in which the cloud-storage identification information is associated with the data identification information; a function of storing the data in the cloud storage.

The program for implementing the present exemplary embodiment is provided, not only through a communication unit, but also by storing the program in a recording medium such as a compact disc-read-only memory (CD-ROM).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor configured to
receive, from a first user, a first data and a first data identification information for identifying the first data and a second data and a second data identification for identifying the second data, wherein the first data identification information and the second data identification information do not include any cloud-storage identification information for identifying a cloud storage for storing data,
generate a storage mapping information comprising a first association information associating the first data, a first cloud-storage identification information for identifying a first cloud storage for storing the first data from among a plurality of cloud storages and a first password for accessing the first cloud storage, and a second association information associating the second data, a second cloud-storage identification information for identifying a second cloud storage for storing the second data from among the plurality of cloud storages, and a second password for accessing the second cloud storage and
store the storage mapping information in the memory and store the first data in the first cloud storage, wherein
when the first user sends a request to search for the first data, the processor receives the first data identification information from the first user, and obtains attribute information of the first data stored in the first cloud storage by referring to the first association information stored in the memory,
the attribute information of the first data is identified by using the first association information associating the first cloud-storage identification information with the first data identification information, and
the storage mapping information comprises a first sharing permission information for indicating that the first data is permitted to be shared with other users comprising a second user, and a second sharing permission information for indicating that the second data is permitted to be shared with the other users.

2. The information processing apparatus according to claim 1,
wherein the processor is further configured to
present the attribute information to the first user.

3. The information processing apparatus according to claim 2, wherein the processor is further configured to, in response to the first user requesting the first data by using the first association information,
obtain the first data from the cloud storage identified by using the first cloud-storage identification information associated with the first data identification information in the first association information, and
present the obtained first data to the first user.

4. The information processing apparatus according to claim 1, wherein the processor is further configured to, in response to the second, different user requesting the first association information, present the first association information to the second user upon a determination that the first association information is permitted to be shared with the second user.

5. The information processing apparatus according to claim 4, wherein the first association information further includes association between the first data identification information and first sharing permission information, the first sharing permission information indicating whether the first data is permitted to be shared with the second user, and
wherein the processor is configured to determine, based on the first sharing permission information, whether the first association information is permitted to be shared with the second user.

6. The information processing apparatus according to claim 4, wherein the first association information further includes association between the first data identification information and first disclosure restriction information of which disclosure to the second user is restricted, and
wherein the processor is configured to present, to the second user, only a portion of the first association information other than the disclosure restriction information.

7. The information processing apparatus according to claim 1, wherein the processor is further configured to
receive a request for the first association information from a second, different user, and
determine whether the first association information is permitted to be shared with the second user,
wherein the processor is configured not to present the first association information to the second user when the determining determines that the first association information on is not permitted to be shared with the second user.

8. The information processing apparatus according to claim 1, wherein the processor is further configured to, in response to the data stored in the cloud storage being changed, change the first association information in accordance with the change.

9. The information processing apparatus according to claim 1, wherein the first association information further includes association between the first data identification information and registration information for the cloud storage, and
wherein the processor is configured to, in response to the registration information being changed, change the registration information associated with the first data identification information in the first association information.

10. An information processing apparatus comprising:
means for receiving, from a first user, a first data and a first data identification information for identifying the first data, and a second data and a second data identification for identifying the second data, wherein the first data identification information and the second data identification information do not include any cloud-storage identification information for identifying a cloud storage for storing data,
means for generating a storage mapping information comprising a first association information associating the first data, a first cloud-storage identification information for identifying a first cloud storage for storing the first data from among a plurality of cloud storages, and a first password for accessing the first cloud storage, and a second association information associating the second data, a second cloud-storage identification information for identifying a second cloud storage for storing the second data from among the plurality of cloud storages, and a second password for accessing the second cloud storage and
means for storing the first association information in a memory of the information processing apparatus and storing the first data in the first cloud storage, wherein
when the first user sends a request to search for the first data, the first data identification information is received from the first user, and first attribute information of the first data stored in the cloud storage is obtained by referring to the first association information stored in the memory,
the attribute information of the first data is identified by using the first association information associating the first cloud-storage identification information with the first data identification information, and
the storage mapping information further comprises a first sharing permission information for indicating that the first data is permitted to be shared with other users comprising a second user and a second sharing permission information for indicating that the second data is permitted to be shared with the other users.

* * * * *